United States Patent
Funaya et al.

(10) Patent No.: US 6,845,214 B1
(45) Date of Patent: Jan. 18, 2005

(54) VIDEO APPARATUS AND RE-ENCODER THEREFOR

(75) Inventors: Koichi Funaya, Tokyo (JP); Osamu Ootsuka, Tokyo (JP)

(73) Assignee: NEC Corporation, Tokyo (JP)

( * ) Notice: Subject to any disclaimer, the term of this patent is extended or adjusted under 35 U.S.C. 154(b) by 793 days.

(21) Appl. No.: 09/614,904

(22) Filed: Jul. 12, 2000

(30) Foreign Application Priority Data

Jul. 13, 1999 (JP) ............................................ 11-198798

(51) Int. Cl.7 ................................................ H04N 7/26
(52) U.S. Cl. ........................ 386/109; 386/111; 386/112
(58) Field of Search ................................ 386/109, 111, 386/112, 124, 125, 96, 104, 105, 106, 27, 33, 92, 46, 40, 45, 1; H04N 7/26

(56) References Cited

U.S. PATENT DOCUMENTS 5,377,051 A * 12/1994 Lane et al. .................... 386/81
5,418,658 A * 5/1995 Kwon .......................... 360/48

FOREIGN PATENT DOCUMENTS

| EP | 0 802 682 A1 | * 10/1997 |
| JP | 06-311043 | 11/1994 |
| JP | 9083948 | 3/1997 |
| JP | 10276400 | 10/1998 |
| JP | 10-285531 A | 10/1998 |
| JP | 11098443 | 4/1999 |
| JP | 11122580 | 4/1999 |

* cited by examiner

*Primary Examiner*—Robert Chevalier
(74) *Attorney, Agent, or Firm*—Foley & Lardner LLP

(57) ABSTRACT

The present video apparatus is provided with a re-encoder having an audio/video processing section disposed between a decoder and an encoder so that the decoded audio/video signals can be re-encoded. Image resolution of the video information is altered by the audio/video processing section so as to control the bit-rate of the audio/video encoding process performed in the encoding section to suit the system performance. Such a configuration of the video apparatus enables to control the file size of the audio/video codes recorded in a recording medium of the recorder. It is also possible to use the audio/video processing section to insert characters, diagrams and image information in the video data, and to insert additional audio data in the original audio data.

32 Claims, 13 Drawing Sheets

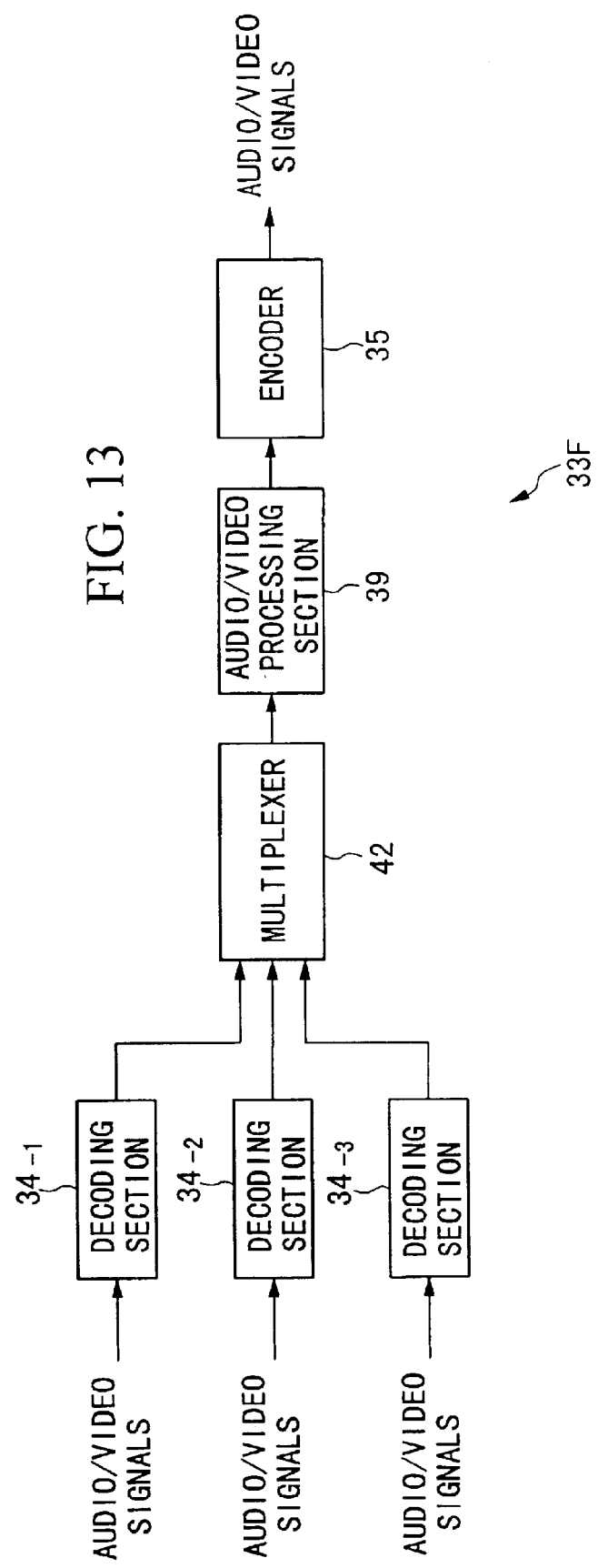

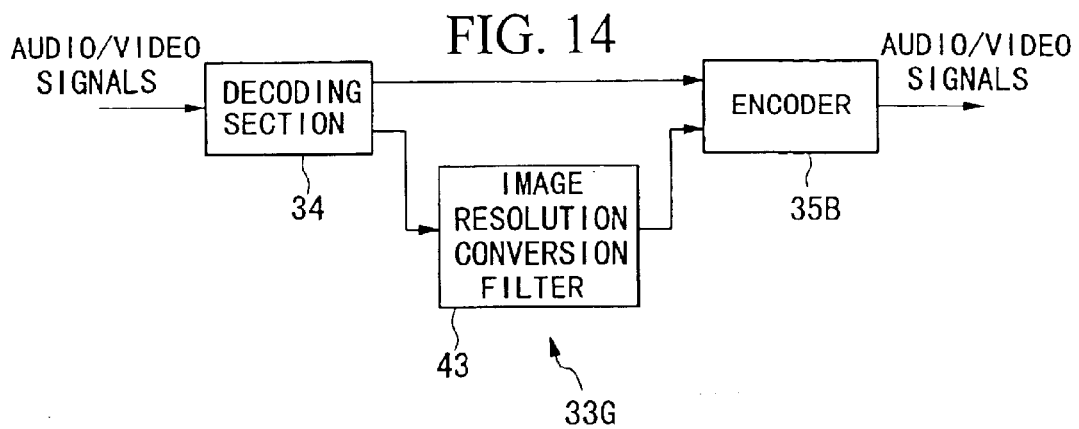
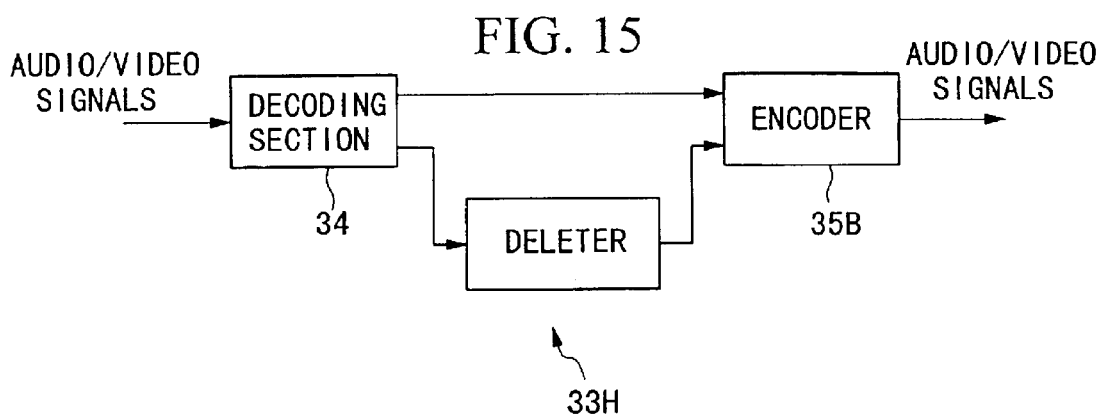
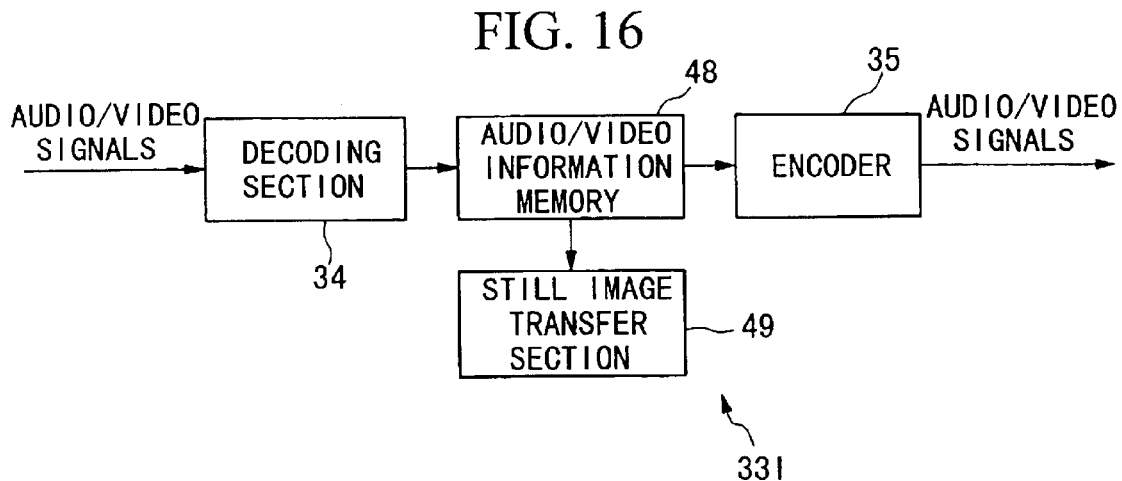

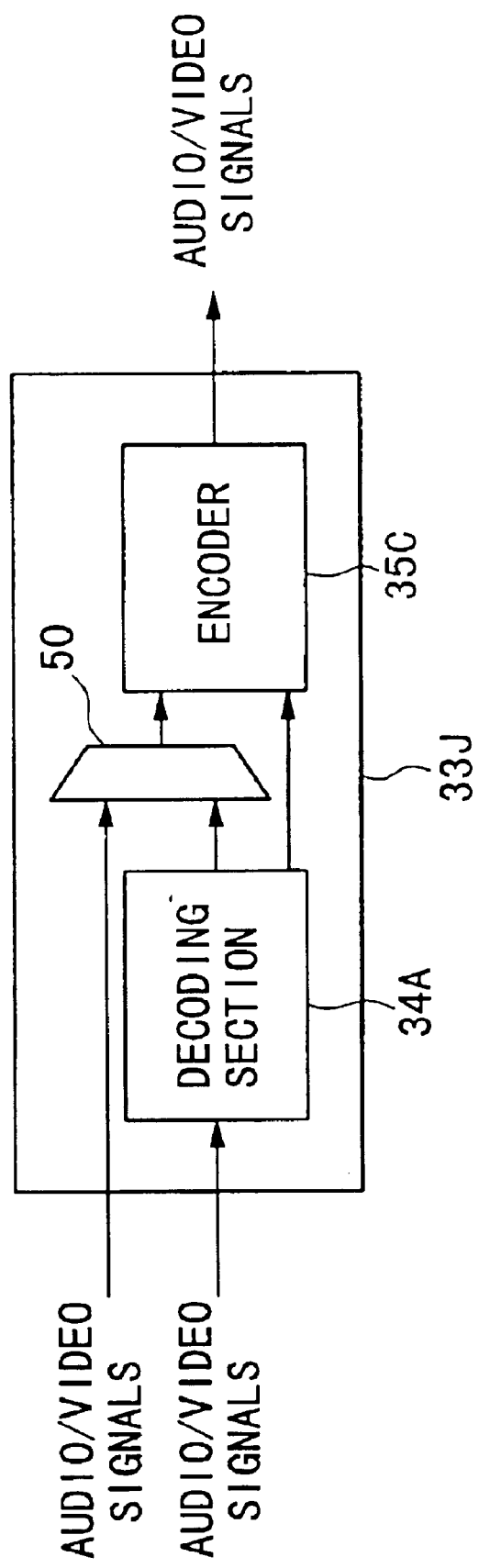

VIDEO APPARATUS AND RE-ENCODER THEREFOR

BACKGROUND OF THE INVENTION

1. Field of the Invention

The present invention relates to a video apparatus for processing encoded audio and video signals, and relates in particular to a video apparatus having a device to enable re-encoding the audio and video signals.

2. Description of the Related Art

An example of the conventional video apparatus is shown in FIG. 21. As shown in FIG. 21, compression encoded audio/video signals are recorded in a video apparatus in the following manner. Video and image input signals are stored on a recording medium 31 in a recording device, and the signals recorded on the recording medium 31 are reproduced and decoded in the decoder 32, and the decoded signals are output externally.

Also, FIG. 22 shows another example of the conventional video apparatus for processing compression encoded audio/video signals or applying special effects to the data. As shown in FIG. 22, processing or applying special effect to the data is carried out after decoding the reproduced compression encoded audio/video signals recorded on the recording medium 31. In more detail, audio/video input signals and effect information are stored first in the recording medium 31, and the audio/video signals stored in the recording medium 31 are reproduced and decoded in the decoder 32, and the audio/video processing section 38 then processes or applies effect information on the audio/video signals decoded in the decoder 32 using the effect information stored on the recording medium 31, and finally the processed data are output.

Also, according to the conventional technology, reproduction managing information is embedded in the pre-encoded raw medium. Therefore, the video apparatus does not have any internal provision for embedding new reproduction managing information into the recording medium, immediately prior to starting to accumulate the audio/video signals distributed from network, broadcasting or other video apparatus.

Also, according to the conventional technology, if the vacancy capacity in the recording medium becomes insufficient, it is not possible to manipulate the audio/video signals themselves to facilitate further recording.

Furthermore, according to the conventional technology, when there are several streams of audio/video signals, each stream of audio/video signals is recorded separately in the recording medium, and after performing reproducing and decoding operations, the decoded signal streams are integrated on an image processing apparatus so that the resulting images can be viewed.

Also, according to the conventional technology, there is no provision for re-encoding audio/video signals input into the video apparatus, and simultaneously outputting audio/video sample signals to be used for data searching purposes.

Also, according to the conventional technology, there is no provision for re-encoding audio/video signals input into the video apparatus, and simultaneously generating sample still images to be used for data searching purposes.

Furthermore, according to the conventional technology, there is no video apparatus that can be used as a stand-alone re-encoding apparatus, whose re-encoding capability can be enhanced by connecting to another re-encoder.

The conventional technology described above presents the following problems.

The first problem is that there is no method for controlling the file size of the audio/video signals recorded in the video apparatus. The reason is that it is not possible to manipulate the audio/video signals without decoding first.

The second problem is that it is not possible to insert character/diagrams/voice/and image information to the audio/video signals to be recorded in the video apparatus.

The third problem is that it is not possible to embed reproduction managing information that is operative even after decoding the audio/video signals recorded in the video apparatus.

The fourth problem is that, if the vacancy capacity in the recording medium becomes depleted while recording the audio/video signals in the video apparatus, there is no provision for manipulating the audio/video signals themselves to facilitate further recording. It follows that it is not possible to reduce the file size of the audio/video signals to be recorded. It is also not possible to display special effects such as a warning sign in the reproduced audio/video signals by simply carrying out reproducing and decoding operations on the recorded audio/video signals.

The fifth problem is that it is not possible to accommodate in one file a number of audio/video signal streams generated by encoding audio/video data, even when it is known that the data are to be displayed on a common screen or to be played on a common speaker. Or, even if the data can be integrated in one file, in reality, the file size is a sum of the file sizes of the various audio/video signal streams, and therefore, reduction in file size cannot be effected.

The sixth problem is that the conventional video apparatus is not able to re-encode audio/video input signals in real-time and to encode the same audio/video signals to generate thumbnail video images in real-time.

The seventh problem is that the conventional video apparatus is not able to re-encode audio/video input signals in real-time and to encode the audio/video signals to generate sample video images for searching purposes by extracting frames from the audio/video signals.

The eighth problem is that the conventional video apparatus is not able to re-encode audio/video input signals in real-time, and, to capture and output still images in real-time by encoding the same audio/video signals.

The ninth problem is that the conventional encoder is not readily amenable to enhancing its re-encoding capability.

SUMMARY OF THE INVENTION

It is an object of the present invention to provide a video apparatus capable of controlling the file size of audio/video data recorded on a recording medium.

It is a second object of the present invention to provide a video apparatus capable of inserting character/diagrams/voice and image information in the audio/video signals recorded on a recording medium.

It is a third object of the present invention to provide a video apparatus capable of embedding reproduction managing information that is operative even after decoding the audio/video signals recorded on a recording medium.

It is a fourth object of the present invention to provide a video apparatus capable of manipulating the audio/video signals to be recorded, if the vacancy capacity in the recording medium becomes depleted while recording the audio/video signals using the video apparatus.

It is a fifth object of the present invention to provide a video apparatus capable of storing a number of audio/video signal streams as encoded audio/video data in one integrated file.

It is a sixth object of the present invention to provide a video apparatus capable of re-encoding audio/video input signals in real-time to generate and encode thumbnail video images in real-time from the same audio/video signals.

It is a seventh object of the present invention to provide a video apparatus capable of re-encoding audio/video input signals in real-time and encoding the resulting audio/video signals to generate sample video images for searching by extracting sample frames.

It is an eighth object of the present invention to provide a video apparatus capable of re-encoding audio/video input signals in real-time, and capturing and outputting still images of the same audio/video data in real-time.

It is a ninth object of the present invention to provide a video apparatus capable of readily enhancing the re-encoding capability.

According to an embodiment of the present invention, a video apparatus is provided for receiving compression encoded digital audio/video signals as audio/video input signals, processing the audio/video input signals and outputting audio/video output signals, wherein the video apparatus is comprised by: a re-encoder for re-encoding the audio/video input signals and outputting re-encoded audio/video signals; a recorder for accumulating the re-encoded audio/video signals as accumulated audio/video signals; and a decoder for reading the accumulated audio/video signals as readout audio/video signals and decoding the readout audio/video signals and outputting processed audio/video signals as audio/video output signals.

According to another embodiment of the present invention, a video apparatus is provided for receiving compression encoded digital audio/video signals as audio/video input signals, processing the audio/video input signals and outputting audio/video output signals, wherein the video apparatus is comprised by: a recorder for accumulating the re-encoded audio/video signals as accumulated audio/video signals; a selector for selecting either the audio/video input signals or the readout audio/video signals, and outputting selected audio/video signals; and a decoder for decoding the selected audio/video signals, and outputting encoded audio/video signals as the re-encoded audio/video signals; and an encoder for compression encoding the decoded audio/video signals, and outputting compression encoded audio/video signals; wherein when recording audio/video signals in the recorder, the selector selects the audio/video input signals as the selected audio/video signals, and compression encoded audio/video signals output from the encoder are accumulated in the recorder as the accumulated audio/video signals; and when externally outputting audio/video signals accumulated in the recorder, the selector selects the readout audio/video signals as the selected audio/video signals; and outputs the decoded audio/video signals output from the encoder as the audio/video output signals.

According to the first embodiment of the present video apparatus, before recording the audio/video signals in the recorder, the audio/video signals are decoded in the decoding section and the decoded signals are re-encoded.

Therefore, by adjusting the bit-rate of encoding process performed in the encoding section, the file size of audio/video codes recorded on a recording medium in the recorder can be controlled.

Also, according to the second embodiment of the present video apparatus, the audio/video processing section is disposed between the decoding section and the encoder provided within the re-encoder for re-encoding the audio/video signals. By converting the degree of image resolution in the audio/video processing section, the bit-rate of the encoder for encoding the audio/video signals can be controlled. Therefore, it is possible to control the file size of the audio/video data recorded on a recording medium in the recorder.

Also, according to the second embodiment of the present video apparatus, embedding of reproduction managing information is performed in the audio/video processing section disposed between the decoding section and the encoder. Because the reproduction managing information is embedded prior to encoding the audio/video signals, it is possible to embed reproduction managing information that is operative even after the audio/video signals have been decoded.

Further, according to the third and fourth embodiments of the present video apparatus, audio/video signals are input through the re-encoder before the audio/video signals are recorded on a recording medium. When encoding the audio/video signals in the encoder provided in the re-encoder, because the process of encoding itself is controlled, it is possible to suppress bit-rate, to reduce the color difference information or to control the brightness information when the vacancy capacity in the recorder (recording medium) becomes insufficient. Therefore, when the vacancy capacity in the recording medium becomes insufficient, it is possible to reduce the file size by manipulating the audio/video signals to be recorded, or to warn the user when the audio/video signals are being reproduced/decoded.

Also, according to the fifth and sixth embodiments of the present video apparatus, several streams of audio/video signals are decoded individually, and the audio/video signals resulting from the decoding process are superimposed and pasted in the audio/video processing section. This function enables to integrate several streams of audio/video signals into one integrated file containing encoded audio/video data.

According to the seventh embodiment of the present video apparatus, in the re-encoder, decoded audio/video signals are encoded as they are, and concurrently, the same audio/video signals are subjected to an image resolution conversion process and the converted signals are encoded. By performing these two processes simultaneously in parallel, audio/video input signals can be re-encoded in real-time as well as to generate and encode thumbnail video images from the same audio/video signals in real-time.

According to the eighth embodiment of the present video apparatus, in the re-encoder, decoded audio/video signals are encoded as they are, and concurrently, those audio/video signals obtained by selectably deleting some frames of the video signals are encoded. By performing these two processes simultaneously in parallel, audio/video input signals can be re-encoded in real-time as well as to generate and encode sample video images for searching by extracting some frames from the same audio/video signals in real-time.

According to the ninth embodiment of the present video apparatus, in the re-encoder, an audio/video information memory is provided between the decoding section and the encoder, so that the decoded audio/video signals are temporarily stored in the audio/video information memory, after which the stored images are encoded. And, a function is provided to externally output selected video frames stored in the audio/video information memory. By providing such an arrangement, the present video apparatus is capable of re-encoding the audio/video signals in real-time, and providing desired still images by capturing target still images in the same audio/video signals in real-time.

According to the tenth and eleventh embodiments of the present video apparatus, the encoder provided in the re-encoder receives either audio/video signals output from the decoding section or audio/video signals input from external source, and the encoder also receives coding parameters output from the decoder. When the re-encoder is used alone, re-encoding is performed by the encoder on audio/video signals output from the internal decoding section. When the re-encoder is used in conjunction with another decoder, audio/video signals from an externally connected decoder are input into the encoder provided internally in the re-encoder. Such an arrangement enables a low-resolution re-encoder operating alone to produce high resolution video images by connecting it to an external high-resolution decoder so that high resolution video images are decoded first by the external decoder and then input into the low-resolution re-encoder to be re-encoded.

As evident from the explanation provided above, because the audio/video signals to be input into the recorder is input through the re-encoder, the following benefits are accrued.

The first effect of the present invention is that the present video apparatus enables the file size of the audio/video data recorded on a recording medium to be controlled.

The second effect of the present invention is that the present video apparatus enables characters, diagrams, voice and video images to be inserted in the audio/video signals recorded on a recording medium in.

The third effect of the present invention is that the present video apparatus enables to embed reproduction managing information that can operate effectively, even after the audio/video signals recorded on a recording medium have been decoded.

The fourth effect of the present invention is that, if the vacancy capacity in a recording medium becomes insufficient while recording audio/video signals, the present video apparatus enables to manipulate the audio/video signals themselves for recording.

The fifth effect of the present invention is that the present video apparatus enables a plurality of streams of audio/video signals to be integrated into one file containing integrated encoded audio/video data.

The sixth effect of the present invention is that, in the present video apparatus enables audio/video input signals to be re-encoded in real-time as well as to generate and encode thumbnail video images from the same audio/video signals in real-time.

The seventh effect of the present invention is that the present video apparatus enables to re-encode audio/video input signals in real-time as well as to generate and encode sample video images for searching by extracting some frames from the same audio/video signals in real-time.

The eighth effect of the present invention is that the present video apparatus enables to re-encode the audio/video signals in real-time, and provide desired still images by capturing target still images in the same audio/video signals in real-time.

The ninth effect of the present invention is that the present video apparatus enables to readily enhance the re-encoding capability.

BRIEF DESCRIPTION OF THE DRAWINGS

FIG. 13 is a block diagram of another embodiment of the re-encoder of the present invention for providing re-encoding a plurality of audio/video code signals.

FIG. 14 is a block diagram of a re-encoder of the present invention for providing thumbnail video images.

FIG. 15 is a block diagram of a re-encoder of the present invention for providing sample video images for searching purposes.

FIG. 16 is a block diagram of a re-encoder of the present invention for providing sample still images for searching purposes.

FIG. 17 is a block diagram of another embodiment of the re-encoder of the present invention.

DESCRIPTION OF THE PREFERRED EMBODIMENTS

Preferred embodiments will be explained in detail in the following with reference to the drawings.

Figure 1:
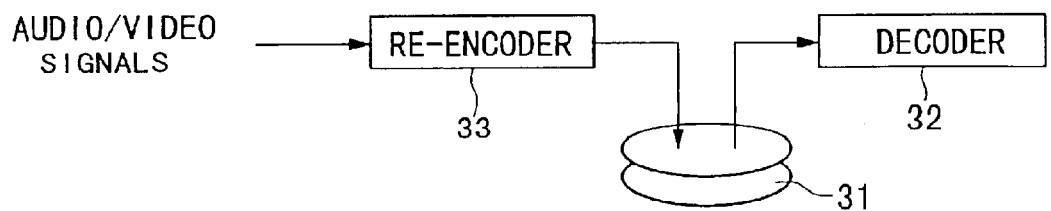
FIG. 1 is a block diagram of an embodiment of the video apparatus of the present invention.

FIG. 1 is a block diagram of a first embodiment of the video apparatus.

The video apparatus is comprised by a recorder 31 representing a recording medium, a decoder 32 and a re-encoder 33.

The operation of the video apparatus shown in FIG. 1 will be explained. First, audio/video signals input into the video apparatus or audio/video signals generated within the video apparatus are input into the re-encoder 33. The re-encoder 33 re-encodes the audio/video input signals, and outputs re-encoded audio/video signals. The re-encoded audio/video signals are accumulated in a recorder 31 as accumulated audio/video signals. The accumulated audio/video signals read from the recorder 31 are supplied as readout audio/video signals to a decoder 32. The decoder 32 decodes the readout audio/video signals, and externally outputs decoded audio/video signals as audio/video output signals.

Figure 2:
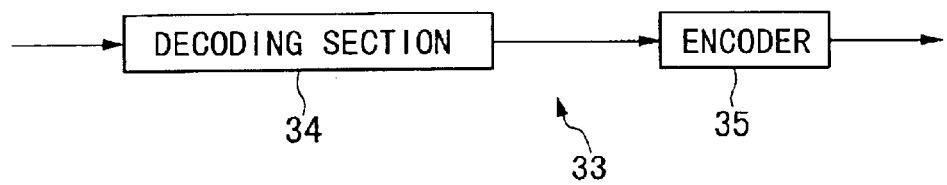
FIG. 2 is a block diagram of a configuration of the re-encoder used in the video apparatus shown in FIG. 1.

FIG. 2 shows an example of the configuration of the re-encoder 33 used in the video apparatus. The re-encoder 33 is comprised by a decoding section 34 and an encoder 35 connected in series. The decoding section 34 decodes the audio/video input signals and outputs decoded audio/video signals. The encoder 35 compression encodes the decoded audio/video signals and outputs compression encoded audio/video signals as re-encoded ir audio/video signals.

Here, regarding the input signals to be input from the decoding section 34 to encoder 35, the present video apparatus can function even if only decoded audio/video signals are input into the encoder 35. Also, the present video apparatus may be realized by inputting other types of signals in addition to audio/video signals, such as encoding parameters specifying the method of encoding the audio/video signals. An example of encoding parameter is macroblock information used in encoding according to the MPEG standard (ISO1381-2).

Figure 3:
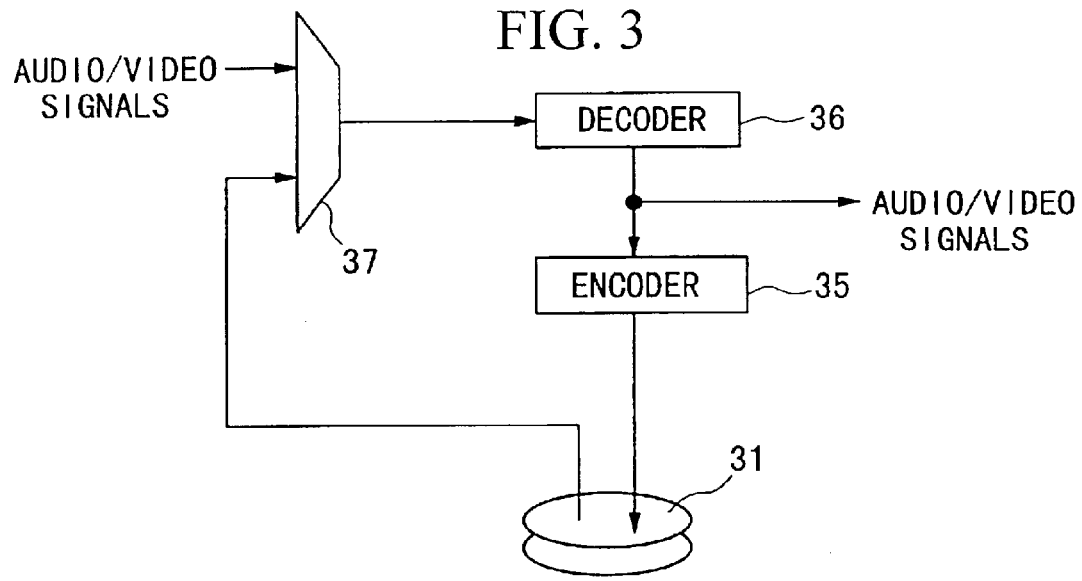
FIG. 3 is a block diagram of another embodiment of the video apparatus of the present invention.

FIG. 3 shows a block diagram of a second embodiment of the present video apparatus. The video apparatus shown in the diagram is realized by replacing the decoder 32 and the decoding section 34 with one decoder 36. That is, the video apparatus shown is comprised by a recorder 31, an encoder 35, a decoder 36 and a selector 37.

The recorder 31 accumulates the audio/video input signals as accumulated audio/video signals. The selector 37 selects either the audio/video input signals or readout audio/video signals output from the recorder 31, and outputs the selected audio/video signals. The decoder 36 decodes the selected audio/video signals, and outputs decoded audio/video signals. The encoder 35 compression encodes the decoded audio/video signals, and outputs compression encoded audio/video signals.

Next, the operation of the video apparatus shown in FIG. 3 will be explained. First, the operation of recording the audio/video codes in the recorder 31 will be explained. In this case, it is assumed that audio/video signals are input from an external source and selected by the selector 37 and input into the decoder 36. By so doing, audio/video input information (selected audio/video signals) is decoded as audio/video signals decoded in the decoder 36, and after compression encoding in the encoder 35, encoded signals are accumulated in the recorder 31 as accumulated audio/video signals.

Next, the operation of decoding the audio/video codes stored (accumulated) in the recorder 31 and externally outputting the audio/video information will be explained. In this case, the selector 37 is switched so that the selected audio/video signals are the audio/video input signals output from the recorder 31 as readout audio/video signals. And, decoded audio/video signals output from the decoder 36??? are output externally as audio/video output signals.

Figure 4:
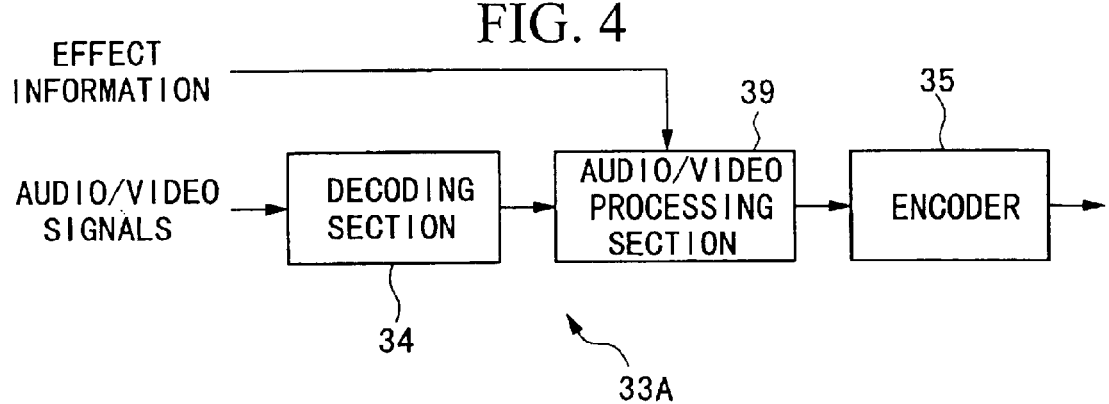
FIG. 4 is a block diagram of a re-encoder for providing audio/video processing.

FIG. 4 shows an example of the configuration of another re-encoder 33A. The re-encoder 33A is comprised by a decoder 24 for decoding the audio/video input signals, audio/video processing section 39 for applying special effects to the encoded audio/video signals output from the decoder 34 according to the effect information, and an encoder 35 for re-encoding the effect-processed audio/video signals.

That is, the decoder 34 decodes audio/video input signals, and outputs decoded C, audio/video signals. The audio/video processing section 34 applies certain processing (in this case, effect processing) to the decoded audio/video signals, and outputs effect-processed audio/video signals. The encoder 35 compression encodes the effect-processed audio/video signals, and output compression encoded audio/video signals as re-encoded audio/video signals.

Figure 5:
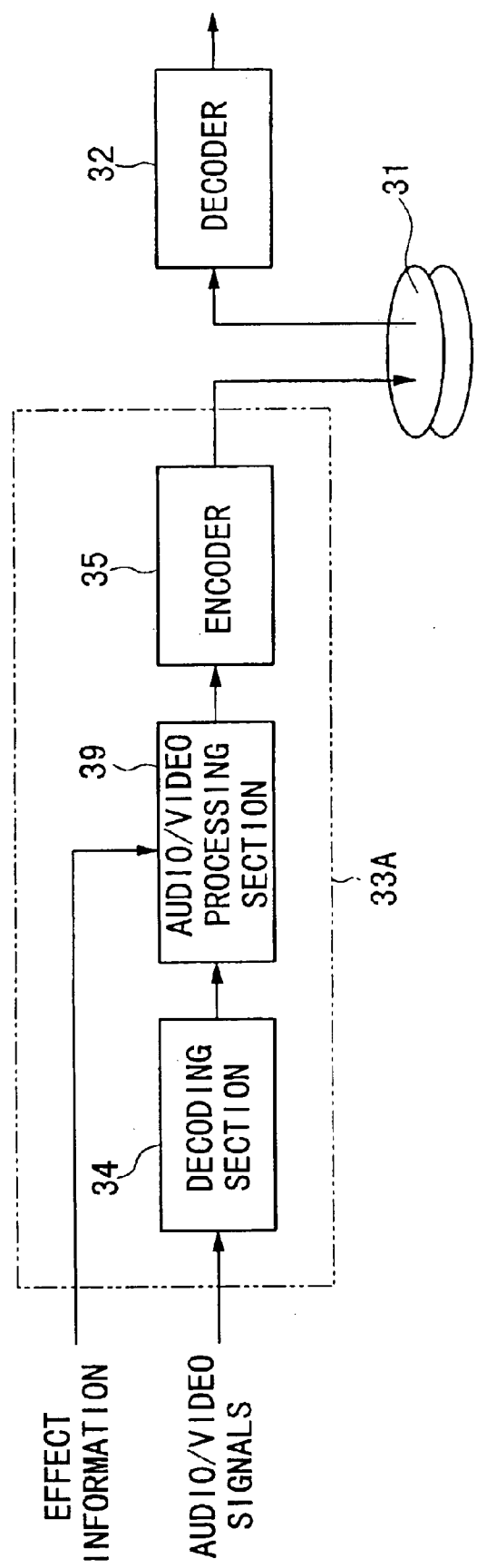
FIG. 5 is a block diagram of still another embodiment of the video apparatus including the re-encoder shown in FIG. 4.

FIG. 5 shows a block diagram of a video apparatus provided with the re-encoder 33A. In the video apparatus shown, audio/video signals re-encoded and output from the re-encoder 33A, according to FIG. 4, are recorded in the recorder 31 as accumulated audio/video signals, and audio/video signals reproduced (readout) from the recorder 31 are decoded by the decoder 32 to produce decoded audio/video signals as audio/video output signals.

Figure 6:
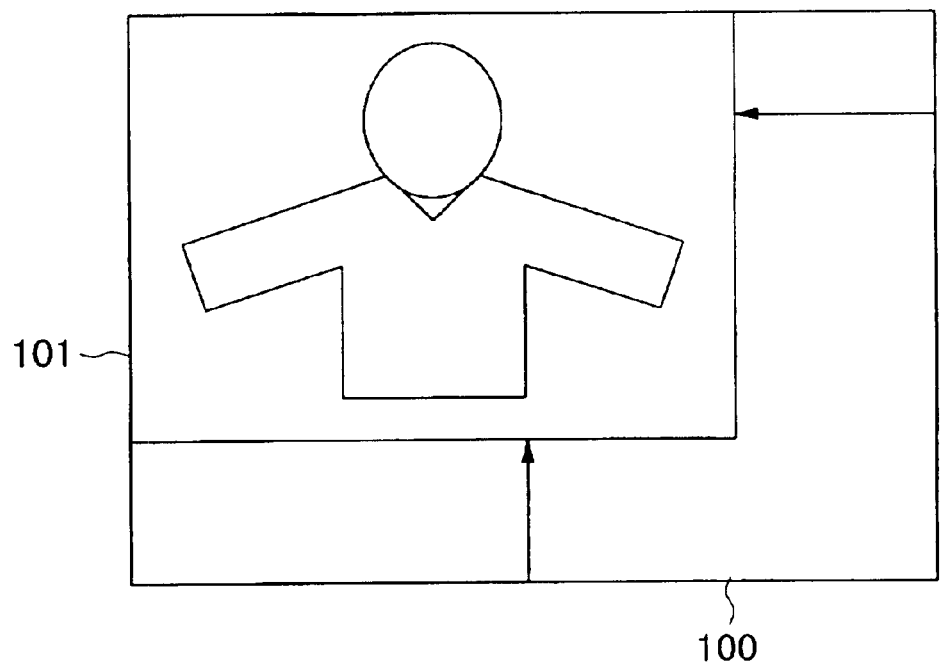
FIG. 6 is an illustration to show an example of audio/video processing in the re-encoder shown in FIG. 4.

FIG. 6 illustrates an example of the effect-processing performed by the audio/video processing section 39 shown in FIG. 4. As illustrated in this diagram, decoded audio/video signals 10×output from the decoder 34 are input into the audio/video processing section 39 for resolution conversion (adjustment) or size conversion and are output as processed audio/video signals 101, which are re-encoded by the encoder 35.

Figure 7:
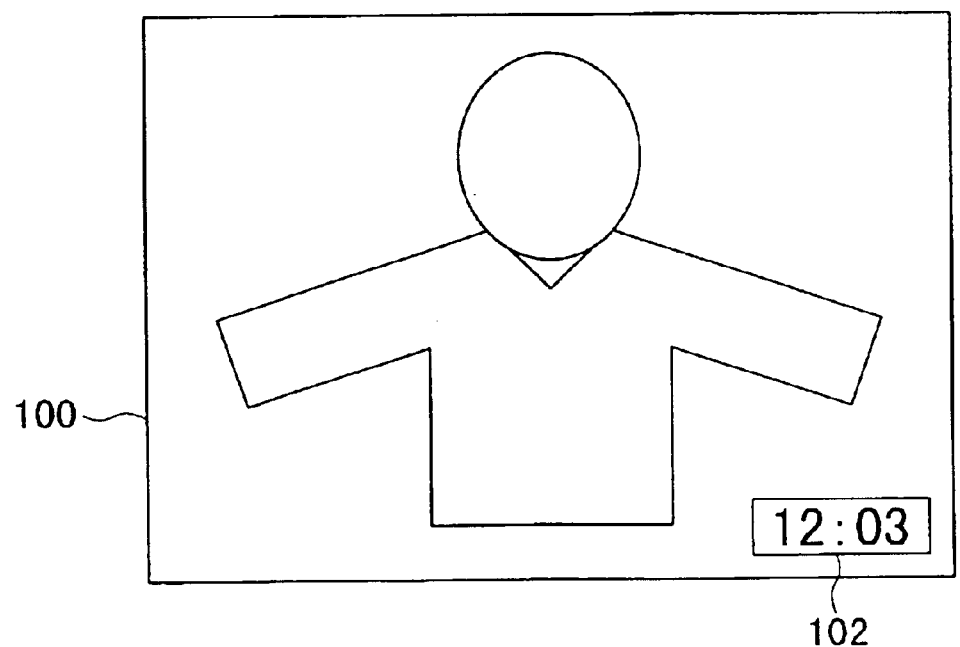
FIG. 7 is an illustration to show another example of audio/video processing in the re-encoder shown in FIG. 4.

FIG. 7 illustrates another example of effect-processing performed by the audio/video processing section 39. As illustrated in this diagram, word strings are superimposed in the audio/video processing section 39 on the decoded audio/video signals 100 output from the decoder 34, which outputs the processed data as video information 102, and the processed audio/video signals that include the video information 102 are re-encoded in the encoder 35. It is possible to superimpose word strings which include word strings specified by a private user of the video apparatus, dates, file names as well as general word strings. Also, it is possible to include all manners of image superposition including a method in which the uderlayer is hidden by the superposed overlayer as well as a method in which the uderlayer and the overlayer are made partially transparent, as well as other superposition methods according to general techniques of graphic illustration.

Figure 8:
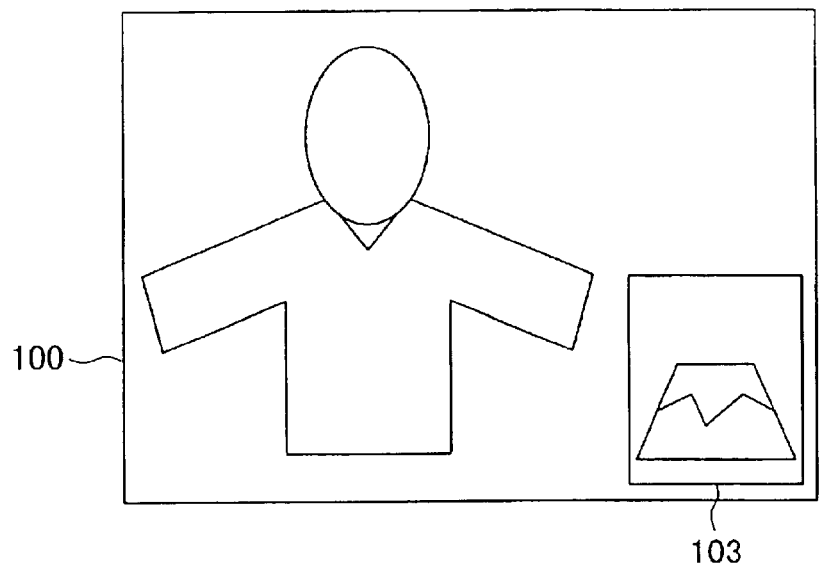
FIG. 8 is an illustration to show still another example of audio/video processing in the re-encoder shown in FIG. 4.

FIG. 8 illustrates another example of effect-processing performed by the audio/video processing section 39. As illustrated in this diagram, image/video information is superimposed on the audio/video signals 100 output from the decoder 34 by the audio/video processing section 39, which outputs the processed data as image/video information 103, and the processed audio/video signals that include the image/video information 103 are re-encoded in the encoder 35. Image/video information may include still images, video images, animation and other general image/video information. Also, as explained in connection with FIG. 7, superimposition can be performed using generally known methods.

The effects which can be achieved in the audio/video processing section 39 include image size reduction and enlargement, image relocation within the picture, rotation, shape change, frame number reduction, field number reduction, interlacing, prodaleship??? conversion, prodaleship-interlace conversion, brightness adjustment, color tone adjustment, image, image file filter, aspect conversion, shape superposition and other general graphic techniques.

Figure 9:
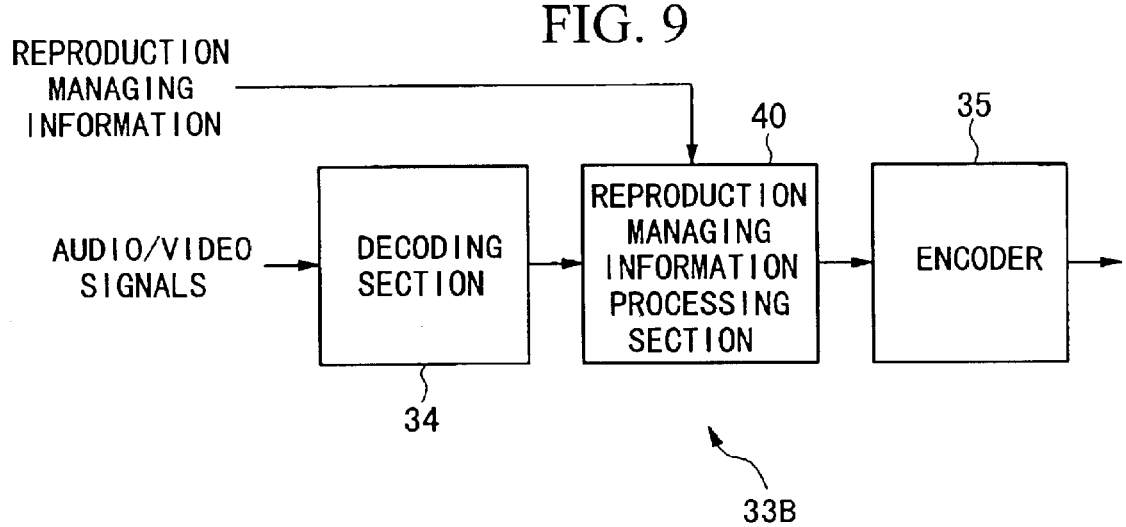
FIG. 9 is a block diagram of a re-encoder of the present invention for providing embedding of reproduction managing information.

FIG. 9 shows another example of the configuration of the re-encoder 33B for use in the video apparatus shown in FIG. 1. The re-encoder 33B is comprised by a decoding section 34, reproduction managing section 40 and an encoder 35.

The audio/video signals decoded by the decoder 34 in the re-encoder 33B are subjected to reproduction information processing in the reproduction managing information processing section 40 in accordance with the given reproduction managing information. The processed audio/video signals output from the reproduction managing information processing section 40 according to reproduction managing information are converted to compression encoded audio/video signals in the encoder 35. This processing method enables to embed reproduction managing information in the audio/video signals that is not erased even after subjecting the audio/video signals to an encoding process.

Figure 10:
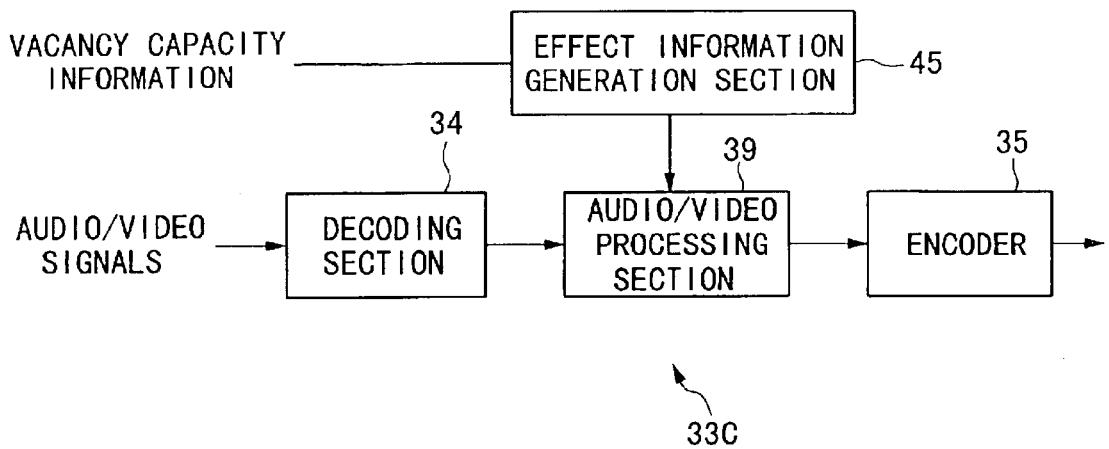
FIG. 10 is a block diagram of a re-encoder of the present invention for providing an effect for vacancy capacity information.

FIG. 10 shows a block diagram of an example of the configuration of still another re-encoder 33C for use in the video apparatus shown in FIG. 1. The re-encoder 33C has the same configuration as the re-encoder 33A shown in FIG. 4, except for the further provision of an effect information generating section 45.

Vacancy capacity information showing the vacancy capacity in the recorder 31 (refer to FIG. 1) is input in the effect information generating section 45 in the re-encoder 33C. The effect information generating section 45 converts vacancy capacity information into effect information, which is supplied to the audio/video processing section 39. Examples of the method of converting the vacancy capacity information into effect information include a method of dropping the color difference information when the vacancy capacity becomes less than a specific amount, and a method of lowering the image resolution to a predetermined lower level when the vacancy capacity becomes less than a specific amount. Another example is a method of automatically controlling the image resolution in accordance with the vacancy capacity available.

Figure 11:
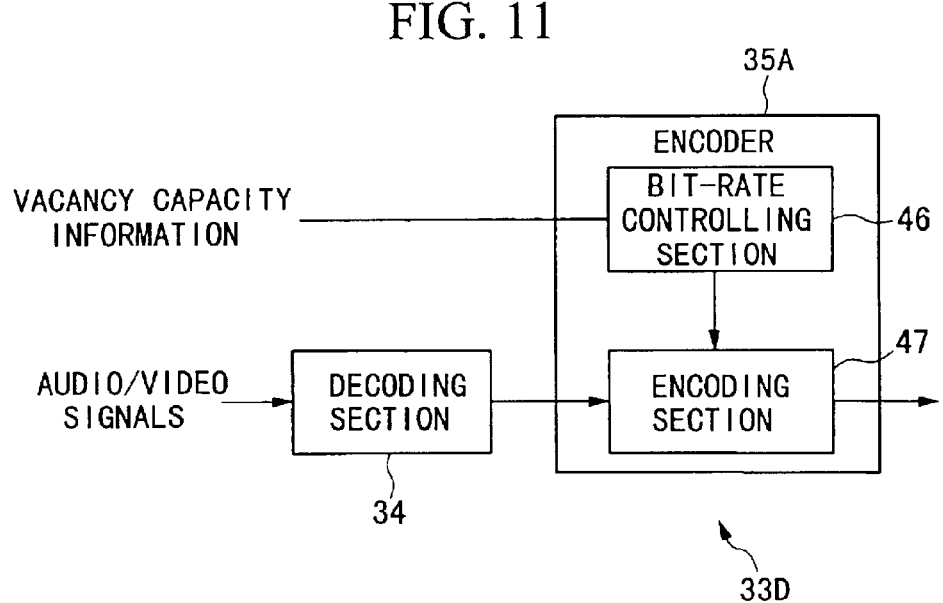
FIG. 11 is a block diagram of a re-encoder of the present invention for providing bit-rate control according to vacancy capacity information.

In FIG. 11 shows a block diagram of an example of the configuration of yet another re-encoder 33D for use in the video apparatus shown in FIG. 1. The re-encoder 33D has the same configuration as the re-encoder 33 shown in FIG. 2, except for the change in the encoder as described below. Therefore, the encoder is designated by 35A.

The encoder 35A is comprised by a bit-rate control section 46 and a encoding section 47. The bit-rate controlling section 46 in the encoder 35A is controlled by vacancy capacity information, and the encoding section 47 is controlled by the bit-rate control signals output from the bit-rate controlling section 46. An example of the method for controlling the bit-rate is a method based on time-averaged value of bit-rates to be allocated to the codes depending on the value of the vacancy capacity. Another example of the method for controlling the bit-rate is a method based on controlling the color difference information, depending on the vacancy capacity available. Another example of controlling the bit-rate is a method based on controlling the brightness according to the vacancy capacity available.

Figure 12:
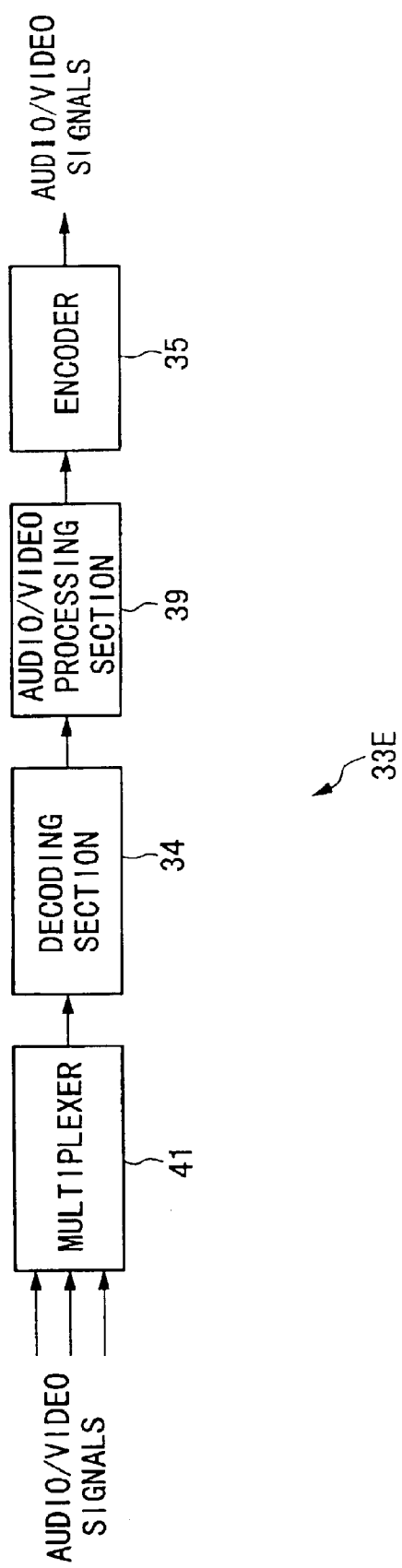
FIG. 12 is a block diagram of an embodiment of the re-encoder of the present invention for providing re-encoding a plurality of audio/video code signals.

FIG. 12 shows a block diagram of an example of the configuration of another kind of re-encoder 33E. The re-encoder 33E is the same as the re-encoder 33A shown in FIG. 4 except for the further provision of a multiplexer 41.

A plurality of audio/video signals (code streams) are input into the multiplexer 41 in the re-encoder 33E. The audio/video signal streams are time-division multiplexed in the multiplexer 41. Time-division multiplexed audio/video signals output from the multiplexer 41 are input into the decoding section 34. The decoding section 34 decodes time-division multiplexed audio/video signals, and the decoded audio/video signals are output to the audio/video processing section 39. The audio/video processing section 39 processes the decoded audio/video signals, and the processed audio/video signals are output to the encoder 35. The encoder 35 compression encodes the processed audio/video signals, and compression encoded audio/video signals are output as re-encoded audio/video signals produced by re-encoding the compression encoded audio/video signals.

FIG. 13 shows a block diagram of an example of the configuration of still another re-encoder 33F. The re-encoder 33F is comprised by Nos. 1~3 decoding sections 34-1~3, a multiplexer 42, an audio/video processing section 39 and an encoder 35.

The Nos. 1~3 audio/video input signals (code streams) are input into respective Nos.1~3 decoding sections 34-1~3 in the re-encoder 33F. The Nos. 1~3 decoding sections 34-1~3 decode respective Nos. 1~3 audio/video input signals, which are input into the multiplexer 42. The multiplexer 42 performs time-division multiplexing of Nos. 1~3 decoded audio/video signals, and the multiplexed audio/video signals are output to the audio/video processing section 39. The audio/video processing section 39 processes the time-division multiplexed audio/video signals, and the processed audio/video signals are output to the encoder 35. The encoder 35 compression encodes the processed audio/video signals, and the compression encoded audio/video signals are output as audio/video signals produced by re-encoding the compression encoded audio/video signals.

FIG. 14 shows a block diagram of an example of the configuration of another re-encoder 33G. The re-encoder 33G has the same configuration as the re-encoder 33 shown in FIG. 2, except for the further provision of an image resolution conversion filter 43. The image resolution conversion filter 43 is provided between a decoding section 34 and an encoder 35B.

Decoded audio/video signals output from the decoding section 34 in the re-encoder 33G are input as-is into the encoder 35B as well as into the image resolution conversion filter 43. The image resolution conversion filter 43 alters the resolution of the video information portion of the decoded audio/video signals output from the decoding section 34, and the converted audio/video signals are output to the encoder 35B. The converted audio/video signals are called video thumbnails. In the encoder 35B, two groups of audio/video input signals are encoded separately as individual audio/video signals, and the encoded audio/video signals are output as re-encoded audio/video signals.

Here, in the embodiment shown in FIG. 14, the same result is produced if the encoded audio/video signals output from the encoder 34 and the converted audio/video signals output from the image resolution conversion filter 43 are encoded in separate encoders.

FIG. 15 shows a block diagram of an example of the configuration of still another re-encoder 33H. The re-encoder 33H is the same as the re-encoder 33 shown in FIG. 2, except for the further provision of a deleter 44. The deleter 44 is provided between the encoding section 34 and the encoder 35B.

Decoded audio/video signals output from the decoding section 34 in the re-encoder 33H are input as-is into the encoder 35B as well as into the deleter 44. The deleter 44 deletes a portion of the decoded audio/video signals output from the decoder 34, and the audio/video signals resulting from deletion are output to the encoder 35B. In the encoder 35B, two groups of audio/video input signals are encoded separately as individual audio/video signals, and encoded audio/video signals are output as independently re-encoded audio/video signals. An example of the method of deleting a portion of the audio/video signals in the deleting section 44 is a method based on deleting certain video frames in the decoded audio/video signals at a given interval.

FIG. 16 shows a block diagram of an example of the configuration of still another re-encoder 33I.

The re-encoder 33I is the same as the re-encoder 33 shown in FIG. 2, except for the further provision of an audio/video memory 48 and a still-image transfer section 49. The audio/video memory 48 is provided between the encoding section 34 and the encoder 35, and the still-image transfer section 49 is connected to the audio/video memory 48???.

Decoded audio/video signals output from the decoding section 34 is stored temporarily in the audio/video memory 48 in the re-encoder 33I, and then input into the encoder 35. Then, certain specific frames in the audio/video signals stored in the audio/video memory 48 are captured by the still-image transfer section 49, and are output externally.

FIG. 17 shows a block diagram of an example of the configuration of yet another re-encoder 33J. The re-encoder 33J shown in the diagram is comprised by a decoding section 34A, an encoder 35C and a selector 50. In this example, first and second audio/video input signals are supplied to the re-encoder 33.

The decoding section 34A decodes the first audio/video input signals and inputs the decoded audio/video signals into the selector 50, and inputs coding parameters obtained in the decoding process into the encoder 35C. The selector 50 selects either the externally-input second audio/video signals or decoded audio/video signals output from the decoding section 34A, and inputs the selected audio/video signals into the encoder 35C. In the encoder 35C, the selected audio/video signals are encoded according to coding parameters, and encoded audio/video signals are generated and output as re-encoded audio/video signals.

The coding parameters, in this case, refer to macroblock information such as MPEG standard (ISO1381-2), for example.

Figure 18:
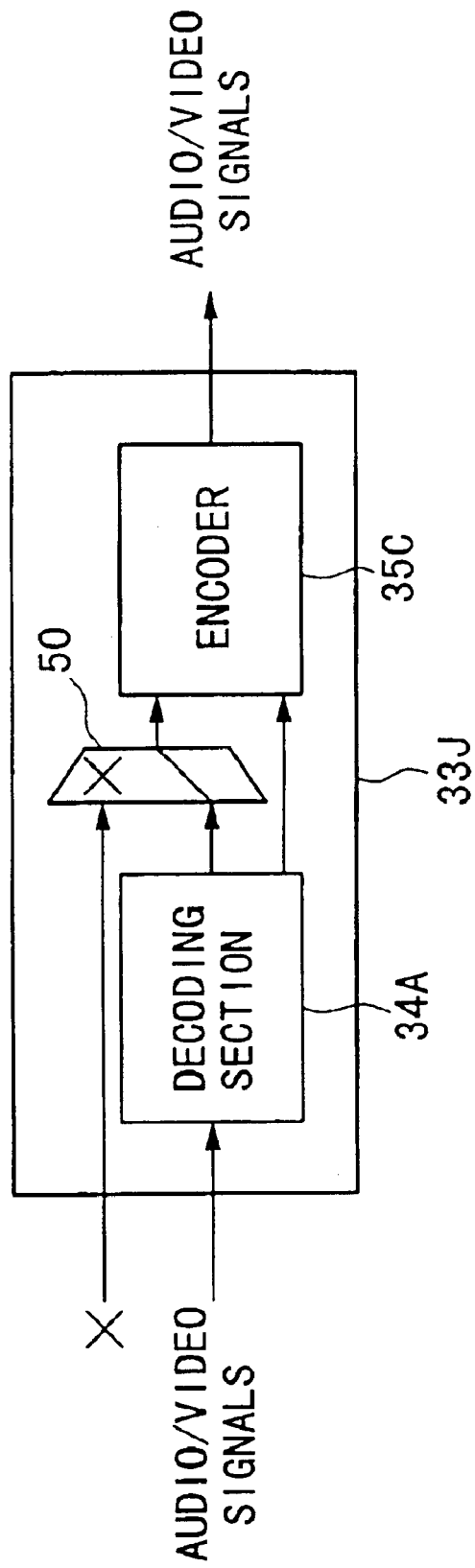
FIG. 18 is a block diagram for explaining the results obtained by using the re-encoder shown in FIG. 17 by itself.

FIG. 18 shows an example of the lone use of re-encoder 33J in the video apparatus shown in FIG. 17 for independent encoding of audio/video signals. The second audio/video signals are not input into the re-encoder 33J, and the selector 50 selects and inputs the decoded audio/video signals output from the decoding section 34A into the encoder 35C as the selected audio/video signals.

Figure 19:
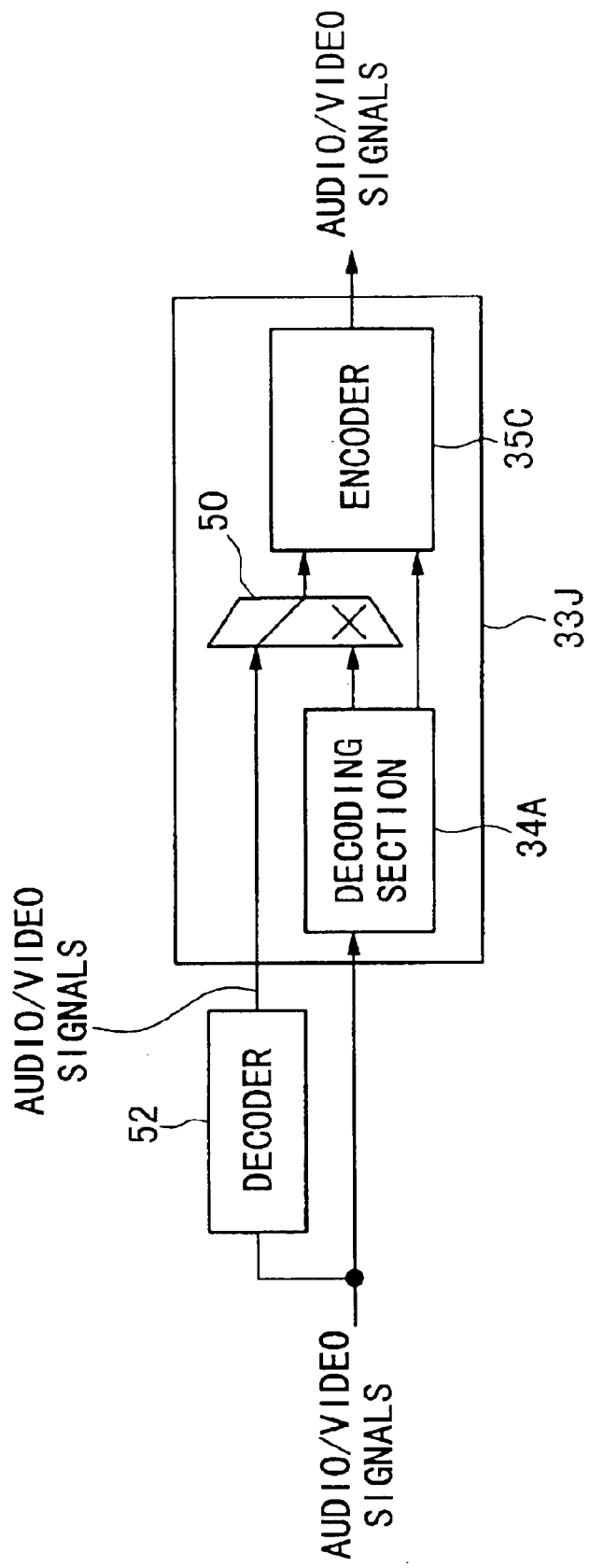
FIG. 19 is a block diagram for explaining the results obtained by using the re-encoder shown in FIG. 17 in conjunction with another decoder.

FIG. 19 shows an example of the use of the present video apparatus having the re-encoder 33J shown in FIG. 17 in conjunction with another encoder 52 to perform re-encoding of audio/video input signals. In this case, audio/video input signals are input into the re-encoder 33J and the decoder 52. The decoder 52 decodes the audio/video input signals, and outputs external decoded audio/video signals. The external decoded audio/video signals are input into the encoder 35C as the selected decoded audio/video signals by way of the selector 50. In the meantime, the encoding section 34A inputs coding parameters obtained by decoding the audio/video input signals into encoder 35C.

Such a configuration enables the video apparatus to operate even when there is disparity in the device capabilities. For example, when the decoder 52 has an ability to decode audio/video input signals at a high resolution mode, and the decoder 34A has an ability to extract coding parameters from the audio/video input signals at a high resolution mode, but the decoding section 0.34A does not have the capability to produce decoded audio/video signals from the high resolution mode audio/video input signals. The configuration of the present video apparatus can operate even under such a condition.

Figure 20:
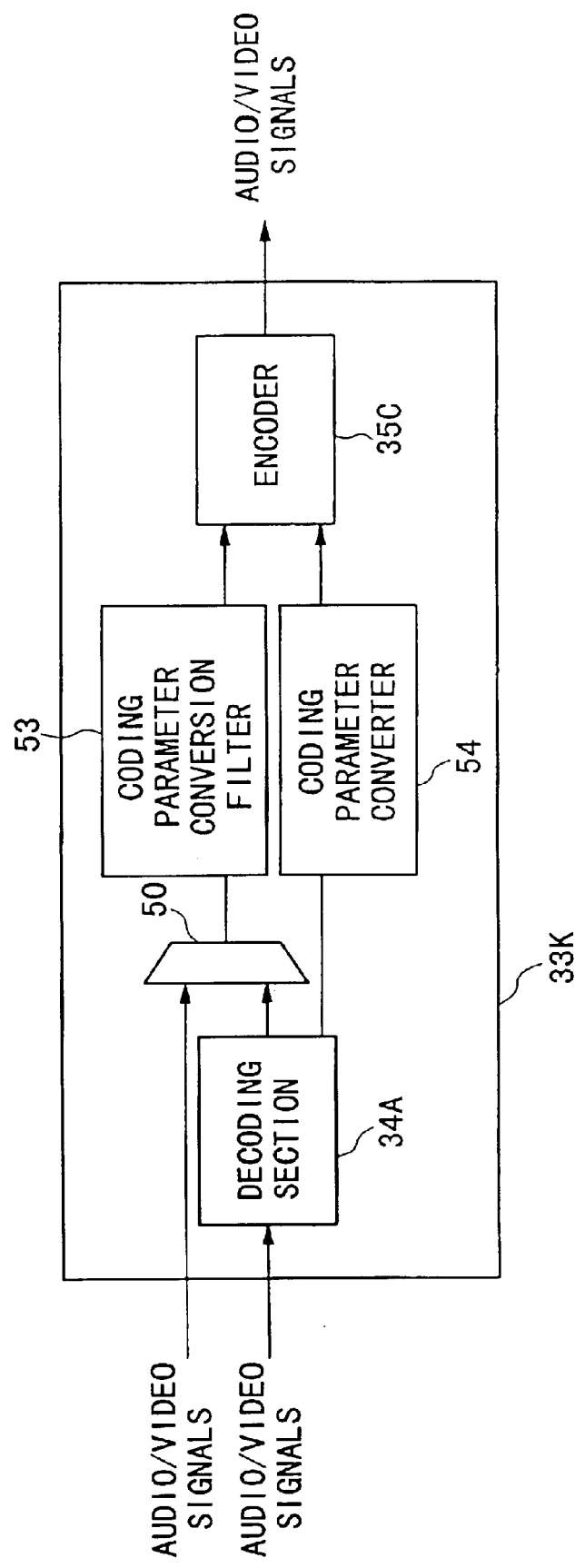
FIG. 20 is a block diagram of still another embodiment of the re-encoder of the present invention.
Figure 21:
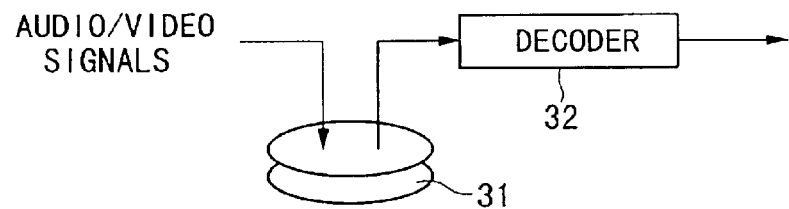
FIG. 21 is a block diagram of the conventional video apparatus.
Figure 22:
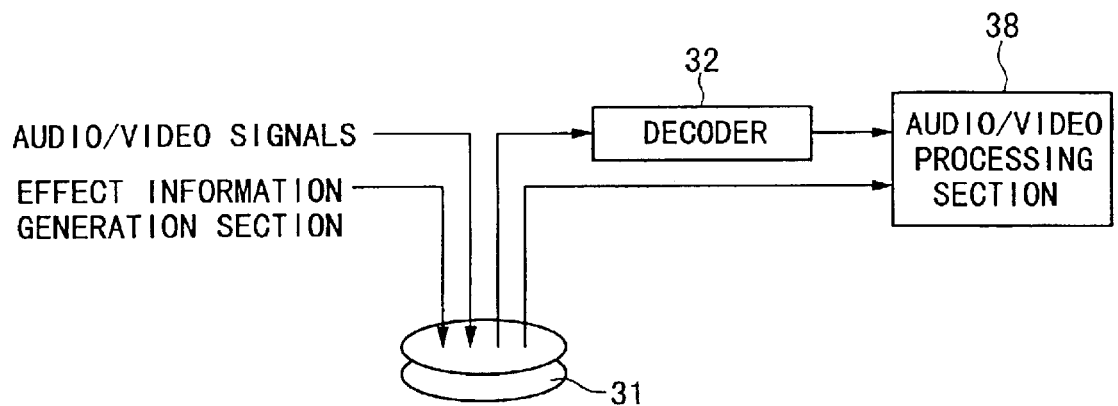
FIG. 22 is a block diagram of another example of the conventional video apparatus.

FIG. 20 shows a block diagram of an example of the configuration of another re-encoder 33K. The re-encoder 33K has the same configuration as the re-encoder 33J shown in FIG. 17, except for the further provision of an image resolution conversion filter 53 and a coding parameter converter 54. The image resolution conversion filter 53 is provided between the selector 50 and the encoder 35C, and a coding parameter converter 54 is provided between the decoding section 34A and the encoder 35C.

Audio/video signals input in the encoder 35C pass through the image resolution conversion filter 53 in the re-encoder 33K to convert the image resolution, and the converted signals are input into the encoder 35C. In this case, coding parameters are converted in the coding parameter converter 54 in accordance with the conversion factor in the image resolution conversion filter 53. The functions in the image resolution conversion filter 53 may include a function to adjust the resolution degree of input video signals, that is, to increase or reduce the number of pixels. In this case, in the coding parameter converter 54, coding parameters are altered according to the reducing or enlarging factor of the images. For example, in the case of the MPEG standard (ISO13818-2), the effect of the present invention can be attained by reducing and integrating or enlarging and distributing the values of the moving vector D in accordance with reducing or enlarging factor.

The present invention has been demonstrated above by providing various preferred embodiments, however, it is evident that those skilled in the art can derive modifications a, without departing from the essence of the present invention that re-encoding performed at an appropriate level of input signal reproduction stages significantly enhances video reproduction.

What is claimed is:

1. A video apparatus for receiving compression encoded digital audio/video signals as audio/video input signals, processing the audio/video input signals and outputting audio/video output signals, comprising:
   a re-encoder for re-encoding the audio/video input signals and outputting re-encoded audio/video signals, said re-encoder having internal functions for performing decoding and encoding;
   a recorder for accumulating the re-encoded audio/video signals as accumulated audio/video signals; and
   a decoder for reading the accumulated audio/video signals as readout audio/video signals and decoding the readout audio/video signals and outputting processed audio/video signals as audio/video output signals;
   wherein said re-encoder is comprised by:
   a decoding section for decoding audio/video input signals and outputting decoded audio/video signals;
   an effect information generating section for generating effect information in response to vacancy information representing a vacancy capacity in the recorder;
   an audio/video processing section for applying a process based on the effect information to the decoded audio/video signals, and outputting processed audio/video signals; and
   an encoder for compression encoding the processed audio/video signals, and outputting compression encoded audio/video signals as the re-encoded audio/video signals.

2. A video apparatus according to claim 1, wherein said effect information generating section outputs an instruction to exclude color difference information as the effect information, when a value of the vacancy capacity represented by vacancy information becomes less than a specific number.

3. A video apparatus according to claim 1, wherein said effect information generating section outputs an instruction to reduce image resolution to a specific value as the effect information, when a value of the vacancy capacity represented by vacancy capacity information becomes less than a specific number.

4. A video apparatus according to claim 1, wherein said effect information generating section outputs effect information so that image resolution is controlled dynamically in accordance with vacancy capacity information, when a value of the vacancy capacity represented by vacancy capacity information becomes less than a specific number.

5. A video apparatus according to claim 1, wherein:
said encoder is comprised by: a bit-rate controlling section for generating bit-rate control signals in response to vacancy capacity information presenting a vacancy capacity of the recorder; and an encoding section for compression encoding said decoder audio/video signals, in accordance with said bit-rate control signals and outputting the compression encoded audio/video signals.

6. A video apparatus according to claim 5, wherein said bit-rate controlling section outputs signals for controlling time averages values to be allocated for coding, as the bit-rate control signals, to automatically adjust bit-rates for the compression encoded audio/video signals, in accordance with the values of vacancy capacity represented by the vacancy capacity information.

7. A video apparatus, for receiving compression encoded digital audio/video signals as audio/video input signals, processing the audio/video input signals and outputting audio/video output signals, comprising:
a re-encoder for re-encoding the audio/video input signals and outputting re-encoded audio/video signals, said re-encoder having internal functions for performing decoding and encoding;
a recorder for accumulating the re-encoded audio/video signals as accumulated audio/video signals; and
a decoder for reading the accumulated audio/video signals as readout audio/video signals and decoding the readout audio/video signals and outputting processed audio/video signals as audio/video output signals;
wherein said re-encoder is comprised by:
a decoding section for processing audio/video input signals and outputting decoded audio/video signals; and an encoder for compression encoding the decoded audio/video signals and outputting compression encoded audio/video signals as re-encoded audio/video signals; wherein
said encoder is comprised by: a bit-rate controlling section for generating bit-rate control signals in response to vacancy capacity information presenting a vacancy capacity of the recorder; and an encoding section for compression encoding said decoder audio/video signals, in accordance with said bit-rate control signals and outputting the compression encoded audio/video signals;
wherein said bit-rate controlling section outputs signals for controlling color difference information as the bit-rate control signals in accordance with values of vacancy capacity represented by the vacancy capacity information.

8. A video apparatus for receiving compression encoded digital audio/video signals as audio/video input signals, processing the audio/video input signals and outputting audio/video output signals, comprising:
a re-encoder for re-encoding the audio/video input signals and outputting re-encoded audio/video signals, said re-encoder having internal functions for performing decoding and encoding;
a recorder for accumulating the re-encoded audio/video signals as accumulated audio/video signals; and
a decoder for reading the accumulated audio/video signals as readout audio/video signals and decoding the readout audio/video signals and outputting processed audio/video signals as audio/video output signals;
wherein said re-encoder is comprised by:
a decoding section for processing audio/video input signals and outputting decoded audio/video signals; and an encoder for compression encoding the decoded audio/video signals and outputting compression encoded audio/video signals as re-encoded audio/video signals; wherein
said encoder is comprised by: a bit-rate controlling section for generating bit-rate control signals in response to vacancy capacity information presenting a vacancy capacity of the recorder; and an encoding section for compression encoding said decoder audio/video signals, in accordance with said bit-rate control signals and outputting the compression encoded audio/video signals;
wherein said bit-rate controlling section outputs signals for controlling brightness information as the bit-rate control signals in accordance with value of the vacancy capacity represented by the vacancy capacity information.

9. A video apparatus according to claim 1, wherein said video apparatus is supplied with a plurality of audio/video input signals, and said re-encoder further is comprised by:
a multiplexer for time-division multiplexing of the plurality of audio/video input signals, and outputting time-division multiplexed audio/video signals.

10. A video apparatus according to claim 1, wherein said audio/video processing section embeds reproduction managing information in the decoded audio/video signals, and outputs audio/video signals having embedded reproduction managing information as the processed audio/video signals.

11. A video apparatus for receiving compression encoded digital audio/video signals as audio/video input signals, processing the audio/video input signals and out-putting audio/video output signals, comprising:
a re-encoder for re-encoding the audio/video input signals and outputting re-encoded audio/video signals, said re-encoder having internal functions for performing decoding and encoding;
a recorder for accumulating the re-encoded audio/video signals as accumulated audio/video signals; and
a decoder for reading the accumulated audio/video signals as readout audio/video signals and decoding the readout audio/video signals and outputting processed audio/video signals as audio/video output signals;
wherein said video apparatus is supplied with a plurality of audio/video input signals, and said re-encoder is comprised by:
a plurality of decoding sections for decoding the plurality of audio/video input signals individually, and outputting a plurality of decoded audio/video signals;

a multiplexer for time-division multiplexing of the plurality of decoded audio/video signals, and outputting time-division multiplexed audio/video signals;

an audio/video processing section for applying a specific process to the time-division multiplexed audio/video signals, and outputting processed audio/video signals; and an encoder for compression encoding the processed audio/video signals, and outputting compression encoded audio/video signals as the re-encoded audio/video signals.

12. A video apparatus for receiving compression encoded digital audio/video signals as audio/video input signals, processing the audio/video input signals and outputting audio/video output signals, comprising:

a re-encoder for re-encoding the audio/video input signals and outputting re-encoded audio/video signals, said re-encoder having internal functions for performing decoding and encoding;

a recorder for accumulating the re-encoded audio/video signals as accumulated audio/video signals; and a decoder for reading the accumulated audio/video signals as readout audio/video signals and decoding the readout audio/video signals and outputting processed audio/video signals as audio/video output signals;

wherein said re-encoder is comprised by:

a decoding section for decoding audio/video input signals, and outputting decoded audio/video signals;

a deleter for deleting a portion of the decoded audio/video signals, and outputting deleted audio/video signals; and an encoder for separately encoding said decoded audio/video signals and said deleted audio/video signals, and outputting two independent groups of encoded audio/video signals as the re-encoded signals.

13. A video apparatus according to claim 12, wherein said deleter deletes video frames in the decoded audio/video signals at a given frame interval.

14. A video apparatus according to claim 12, wherein said re-encoder is further comprised by:

an image resolution conversion filter for converting a resolution of the video signal portion of the audio/video signals, and outputting converted audio/video signals.

15. A video apparatus for receiving compression encoded digital audio/video signals as audio/video input signals, processing the audio/video input signals and outputting audio/video output signals, comprising:

a re-encoder for re-encoding the audio/video input signals and outputting re-encoded audio/video signals said re-encoder having internal functions for performing decoding and encoding;

a recorder for accumulating the re-encoded audio/video signals as accumulated audio/video signals; and a decoder for reading the accumulated audio/video signals as readout audio/video signals and decoding the readout audio/video signals and outputting processed audio/video signals as audio/video output signals;

wherein said re-encoder is comprised by:

a decoding section for decoding audio/video input signals, and outputting decoded audio/video signals;

an audio/video information memory for temporarily storing the decoded audio/video signals, and outputting stored audio/video signals; and an encoder for compression encoding the stored audio/video signals, and outputting compression encoded audio/video signals as the re-encoded signals; and means for outputting a specific video frame stored in the audio/video information memory as a still image.

16. A video apparatus for receiving compression encoded digital audio/video signals as audio/video input signals, processing the audio/video input signals and outputting audio/video output signals, comprising:

a re-encoder for re-encoding the audio/video input signals and outputting re-encoded audio/video signals, said re-encoder having internal functions for performing decoding and encoding;

a recorder for accumulating the re-encoded audio/video signals as accumulated audio/video signals; and a decoder for reading the accumulated audio/video signals as readout audio/video signals and decoding the readout audio/video signals and outputting processed audio/video signals as audio/video output signals;

wherein said video apparatus is further provided with an external decoder for decoding audio/video input signals and outputting externally decoded audio/video signals, and said re-encoder is comprised by:

a decoding section for decoding and processing the audio/video input signals, and outputting internally decoded audio/video signals and coding parameters;

a selector for selecting either said internally decoded audio/video signals or said externally decoded audio/video signals, and outputting selected audio/video signals; and a encoder for encoding the selected audio/video signals according to the coding parameters, and outputting encoded audio/video signals as the re-encoded audio/video signals.

17. A video apparatus for receiving compression encoded digital audio/video signals as audio/video input signals, processing the audio/video input signals and outputting audio/video output signals, comprising:

a re-encoder for re-encoding the audio/video input signals and outputting re-encoded audio/video signals said re-encoder having internal functions for performing decoding and encoding;

a recorder for accumulating the re-encoded audio/video signals as accumulated audio/video signals; and a decoder for reading the accumulated audio/video signals as readout audio/video signals and decoding the readout audio/video signals and outputting processed audio/video signals as audio/video output signals;

wherein said video apparatus is supplied with first audio/video input signals and second audio/video input signals, and said re-encoder is comprised by:

a decoding section for decoding and processing the first audio/video signals, and outputting decoded audio/video signals and coding parameters of the decoded audio/video signals;

a selector for selecting either said decoded audio/video signals or said second audio/video input signals, and outputting selected audio/video signals;

an image resolution conversion filter for converting a resolution of the selected audio/video signals, and outputting converted coding parameters;

a coding parameter converter for converting the coding parameter to match a conversion factor of the image resolution conversion filter, and outputting converted coding parameters; and an encoder for encoding the converted audio/video signals according to the converted coding parameters, and outputting encoded audio/video signals as the re-encoded audio/video signals.

18. A re-encoder for receiving compression encoded digital audio/video signals as audio/video input signals for use in a video apparatus for processing the audio/video input signals, wherein said re-encoder re-encodes the audio/video input signals and outputs re-encoded audio/video signals, and said re-encoder is provided with an internal functions for decoding and encoding, comprising:
- a decoding section for decoding audio/video input signals and outputting decoded audio/video signals;
- an effect information generating section for generating effect information in response to vacancy capacity information representing a vacant capacity in the recorder;
- an audio/video processing section for applying a specific process to the decoded audio/video signals according to the effect information, and outputting processed audio/video signals; and
- an encoder for compression encoding said processed audio/video signals, and outputting compression encoded audio/video signals as the re-encoded audio/video signals.

19. A video apparatus according to claim 18, wherein said effect information generating section outputs an instruction to exclude color difference information as the effect information, when a value of the vacancy capacity represented by vacancy capacity information becomes less than a specific number.

20. A video apparatus according to claim 18, wherein said effect information generating section outputs an instruction to reduce image resolution to a specific value as the effect information, when a value of the vacancy capacity represented by vacancy capacity information becomes less than a specific number.

21. A video apparatus according to claim 18, wherein said effect information generating section outputs effect information as that image resolution is controlled dynamically in accordance with vacancy capacity information, when a value of the vacancy capacity represented by vacancy capacity information becomes less than a specific number.

22. A re-encoder according to claim 18, wherein said encoder is comprised by: a bit-rate controlling section for generating bit-rate control signals in response to vacancy capacity information representing a vacancy capacity of the recorder; and an encoding section for compression encoding said decoded audio/video signals, in accordance with said bit-rate control signals and outputting said compression encoded audio/video signals.

23. A re-encoder according to claim 22, wherein said bit-rate controlling section outputs signals for controlling time averaged values to be allocated for coding, as the bit-rate control signals, to automatically adjust bit-rates for the compression encoded audio/video signals, in accordance with values of vacancy capacity represented by the vacancy capacity information.

24. A re-encoder according to claim 18, wherein said audio/video processing section embeds reproduction managing information in the decoded audio/video signals, and outputs audio/video signals having embedded reproduction managing information as the processed audio/video signals.

25. A re-encoder for receiving compression encoded digital audio/video signals as audio/video input signals for use in a video apparatus for processing the audio/video input signals, wherein said re-encoder re-encodes the audio/video input signals and outputs re-encoded audio/video signals, and said re-encoder is provided with an internal functions for decoding and encoding, said re-encoder comprising:
- a decoding section for processing audio/video input signals and outputting decoded audio/video signals; and
- an encoder for compression encoding the decoded audio/video signals and outputting compression encoded audio/video signals as re-encoded audio/video signals;
- wherein said encoder is comprised by: a bit-rate controlling section for generating bit-rate control signals in response to vacancy capacity information representing a vacancy capacity of the recorder, and an encoding section for compression encoding said decoded audio/video signals, in accordance with said bit-rate control signals and outputting said compression encoded audio/video signals;
- wherein said bit-rate controlling section outputs signals for controlling color difference information as the bit-rate control signals in accordance with value of vacancy capacity.

26. A re-encoder for receiving compression encoded digital audio/video signals as audio/video input signals for use in a video apparatus for processing the audio/video input signals, wherein said re-encoder re-encodes the audio/video input signals and outputs re-encoded audio/video signals, and said re-encoder is provided with an internal functions for decoding and encoding, said re-encoder comprising:
- a decoding section for processing audio/video input signals and outputting decoded audio/video signals; and
- an encoder for compression encoding the decoded audio/video signals and outputting compression encoded audio/video signals as re-encoded audio/video signals;
- wherein said encoder is comprised by: a bit-rate controlling section for generating bit-rate control signals in response to vacancy capacity information representing a vacancy capacity of the recorder; and an encoding section for compression encoding said decoded audio/video signals, in accordance with said bit-rate control signals and outputting said compression encoded audio/video signals;
- wherein said bit-rate controlling section outputs signals for controlling brightness information as the bit-rate control signals in accordance with value of vacancy capacity.

27. A re-encoder for receiving compression encoded digital audio/video signals as audio/video input signals for use in a video apparatus for processing the audio/video input signals, wherein said re-encoder re-encodes the audio/video input signals and outputs re-encoded audio/video signals, and said re-encoder is provided with an internal functions for decoding and encoding, said re-encoder comprising:
- a decoding section for processing audio/video input signals and outputting decoded audio/video signals; and
- an encoder for compression encoding the decoded audio/video signals and outputting compression encoded audio/video signals as re-encoded audio/video signals;
- wherein said video apparatus is supplied with a plurality of audio/video input signals said re-encoder being comprised by:
- a plurality of decoding sections for decoding the plurality of audio/video input signals individually, and outputting a plurality of decoded audio/video signals;
- a multiplexer for time-division multiplexing of the plurality of decoded audio/video signals, and outputting time-division multiplexed audio/video signals;
- an encoder for compression encoding the processed audio/video signals, and outputting compression encoded audio/video signals as the re-encoded audio/video signals.

28. A re-encoder for receiving compression encoded digital audio/video signals as audio/video input signals for use in a video apparatus for processing the audio/video input signals, wherein said re-encoder re-encodes the audio/video input signals and outputs re-encoded audio/video signals, and said re-encoder is provided with an internal functions for decoding and encoding comprising:

a decoding section for decoding audio/video input signals, and outputting decoded audio/video signals;

a deleter for deleting a portion of the decoded audio/video signals, and outputting deleted audio/video signals; and an encoder for separately encoding said decoded audio/video signals and said deleted audio/video signals; and an encoder for separately encoding said decoded audio/video signals and said deleted audio/video signals, and outputting two independent groups of encoded audio/video signals as the re-encoded signals.

29. An ere-encoder according to claim 28, wherein said deleter deletes video frames in the decoded audio/video signals at a given frame interval.

30. A re-encoder according to claim 28, wherein said re-encoder is further comprised by:

an image resolution conversion filter for converting a resolution of the video signal portion of the audio/video signals, and outputting converted audio/video signals.

31. A re-encoder for receiving compression encoded digital audio/video signals as audio/video input signals for use in a video apparatus for processing the audio/video input signals, wherein said re-encoder re-encodes the audio/video input signals and outputs re-encoded audio/video signals, and said re-encoder is provided with an internal functions for decoding and encoding comprising:

a decoding section for decoding audio/video input signals, and outputting decoded audio/video signals;

an audio/video information memory for temporarily storing the decoded audio/video signals, and outputting stored audio/video signals; and an encoder for compression encoding the stored audio/video signals, and outputting compression encoded audio/video signals as the re-encoded signals; and means for outputting a specific video flame stores in the audio/video information memory as a still image.

32. A re-encoder for receiving compression encoded digital audio/video signals as audio/video input signals for use in a video apparatus for processing the audio/video input signals, wherein said re-encoder re-encodes the audio/video input signals and outputs re-encoded audio/video signals, and said re-encoder is provided with an internal functions for decoding and encoding, comprising:

wherein said video apparatus is supplied with first audio/video input signals and second audio/video input signals, and said re-encoder is comprised by:

a decoding section for decoding and processing the first audio/video signals, and outputting decoded audio/video signals and coding parameters of the decoded audio/video signals;

a selector for selecting either said decoded audio/video signals or said second audio/video input signals, and outputting selected audio/video signals;

an image resolution conversion filter for converting a resolution of the selected audio/video signals, and outputting converted coding parameters;

a coding parameter converter for converting the coding parameter to match a conversion factor of the image resolution conversion filter, and outputting converted coding parameters; and an encoder for encoding the converted audio/video signals according to the converted coding parameters, and outputting encoded audio/video signals as the re-encoded audio/video signals.

* * * * *